United States Patent [19]

Scott et al.

[11] 4,268,826

[45] May 19, 1981

[54] INTERACTIVE DISPLAY DEVICES

[75] Inventors: Harold A. Scott; David J. Martin, both of Stroud, England

[73] Assignee: Grundy & Partners Limited, Gloucestershire, England

[21] Appl. No.: 38,850

[22] Filed: May 14, 1979

[30] Foreign Application Priority Data

Jul. 26, 1978 [GB] United Kingdom ............... 31220/78

[51] Int. Cl.³ ............................................. G06F 3/147
[52] U.S. Cl. ..................................... 340/707; 178/18; 340/365 P; 340/782
[58] Field of Search ................... 340/707, 708, 365 P; 178/18

[56] References Cited

U.S. PATENT DOCUMENTS

| | | | |
|---|---|---|---|
| 3,579,225 | 5/1971 | Clark | 340/707 |
| 3,768,073 | 10/1973 | Rawson et al. | 340/707 X |
| 3,832,693 | 8/1974 | Ishizaki et al. | 340/707 X |
| 3,932,862 | 1/1976 | Graven | 340/707 X |

Primary Examiner—David L. Trafton
Attorney, Agent, or Firm—Cushman, Darby and Cushman

[57] ABSTRACT

An interactive display device is of the type which displays data and allows an operator to input fresh data and/or change the data that is displayed. The data is displayed by a plurality of arrays of discrete display elements each of which can be independently driven to produce an optical output, and the interactive input is by means of a light pen or "wand" which detects light and which the operator points at the display element associated with the data to which the desired input relates. Driver circuit means scan the arrays of said plurality thereof simultaneously with signals which determine whether each display element is in the ON or OFF state. These scanning signals include coded pulses the coding of which is representative of the particular array being scanned thereby. Means for inputting data comprise said light pen and associated circuit means operative to identify the coded pulses and thus identify the array containing the selected display element.

8 Claims, 12 Drawing Figures

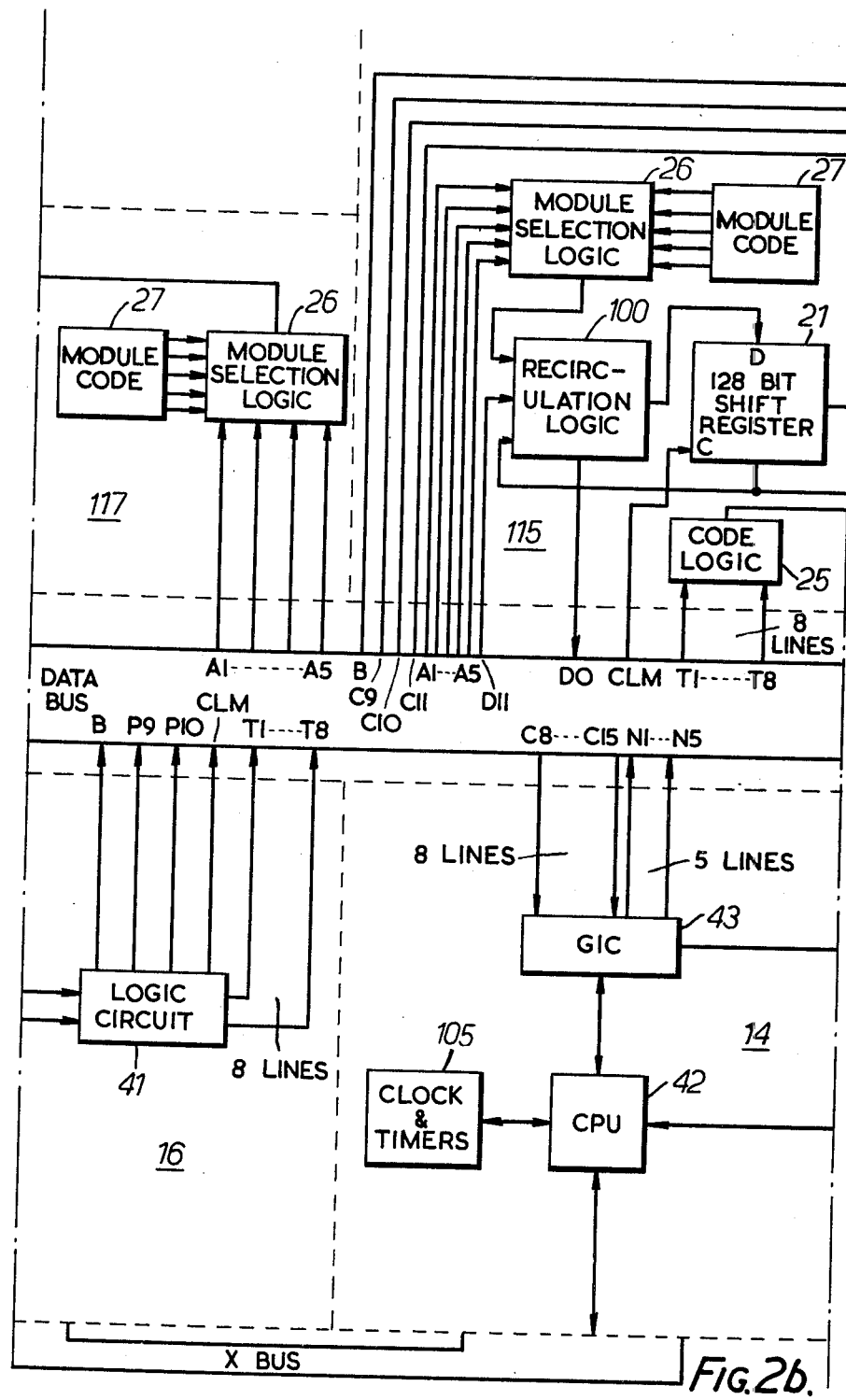

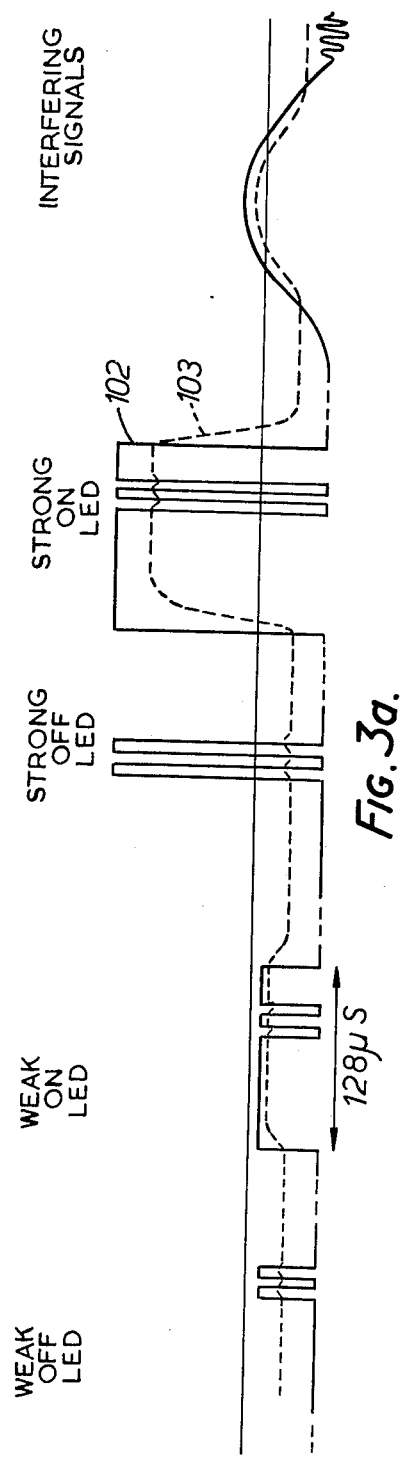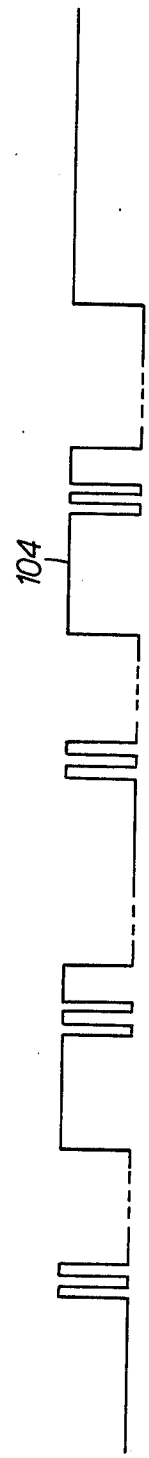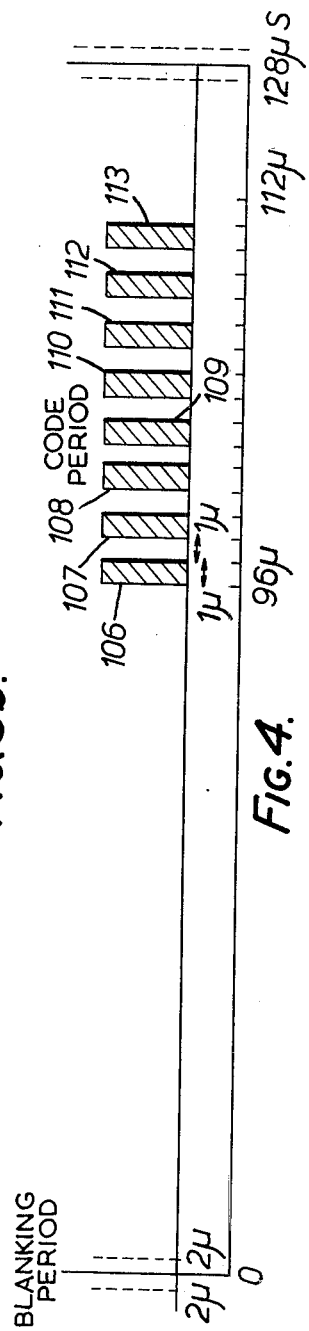

INTERACTIVE DISPLAY DEVICES

BACKGROUND OF THE INVENTION

1. Field of the Invention

This invention relates to interactive display devices of the type which display data and allow an operator to input fresh data and/or change the data that is displayed. It is particularly concerned with such devices in which the data is displayed by an array of discrete display elements each of which can be independently driven to produce an optical output, and in which the interactive input is by means of a "light pen" or wand which detects light and which the operator points at the display element associated with the data to which the desired input relates.

2. Description of the Prior Art

Devices are known in which a matrix of display elements is scanned, the scanning circuit providing for each element a signal which determines the state thereof, i.e. whether or not it produces an observable light output and hence appears to be ON or OFF, and an identifying pulse signal whereby a circuit associated with the pen can identify the actual element at which the pen is pointed. The identifying signal must produce a light output from an OFF element, or absence thereof in the case of an ON element, which is detectable by the pen but not by the operator so that it does not appear to change the observable state of any element. This requirement imposes a limitation on the number of display elements which can be employed.

In said known devices the matrix of display elements is scanned step by step in synchronism with a shift register the state of each bit of which corresponds to the state of a corresponding display element, and sensing of light from a selected element by the pen necessarily operates to invert the value of the associated stored bit in the shift register. This is a functional limitation of the known devices.

SUMMARY OF THE INVENTION

The primary object of the invention is to provide a device in which the number of elements is not so limited as in said known devices. A further object is to provide such a device which can be designed with a modular display arrangement, each module presenting an array of display elements, so that the number and arrangement of modules can be chosen to suit a desired application and large display areas, with a correspondingly large number of display elements, can be achieved.

Yet another object of the invention is to provide a device which can be designed to overcome the aforesaid functional limitation and allow the input of data without necessarily changing the displayed data in the sense of changing the state of a selected element.

According to the invention an interactive display device comprises a plurality of arrays of discrete display elements; driver circuit means which scan the arrays of said plurality thereof simultaneously with signals which determine whether each display element is in the ON or the OFF state and which include coded pulses the coding of which is representative of the array being scanned; and means for inputting data comrising a light pen which can be pointed at a selected display element relating to the input data, and circuit means operative to identify the coded pulses and thus identify the array containing the selected display element.

As the plurality of arrays are scanned simultaneously with differently coded identifying pulses there is theoretically no limit to the number of arrays and hence to the total number of display elements which the device can include and a large display area, for example covering the walls of a room, can easily be achieved. The display area is preferably provided by a modular arrangement, each display module displaying an array of display elements in the form of a matrix of orthogonal rows and columns. However, it will be appreciated that the display elements can be disposed in any desired arrangement and pattern and hence the term "array" as used herein is to be construed accordingly and not necessarily given any precise geometrical limitation.

The driver circuit means may include a shift register for each array clocked in synchronism with the scanning of the array and such that each bit of the shift register corresponds to a display element in the array. A device in accordance with the invention preferably employs a microcomputer which controls the display and interface with the operator and any external device, such as a computer, which may operate to change the displayed information or react according to the information displayed. In this case when the operator communicates with the display, by pointing the light pen at a display element, the microcomputer reacts according to a preprogrammed set of instructions which may cause the associated data bit to be inverted and/or output any other signals.

The light pen is preferably in the form of a wand at the end of a fibre optic cable with a plug and socket connection to a display panel in which the display arrays are mounted, so that a light-sensitive cell of the pen circuit at the socket is protected within the panel.

Other features of the invention will be apparent from the following description, drawings and claims, the scope of the invention not being limited to the drawings themselves as the drawings are only for the purpose of illustrating a way in which the principles of the invention can be applied. Other embodiments of the invention utilising the same or equivalent principles may be used and structural changes may be made as desired by those skilled in the art without departing from the present invention and the purview of the appended claims.

BRIEF DESCRIPTION OF THE DRAWINGS

FIGS. 2(a), 2(b) and 2(c) is a block circuit diagram of the electronic circuitry mounted within the panel;

FIGS. 3(a) and 3(b) and FIG. 4 illustrate graphically light pen signals and coding signals in the device;

Figure 8:
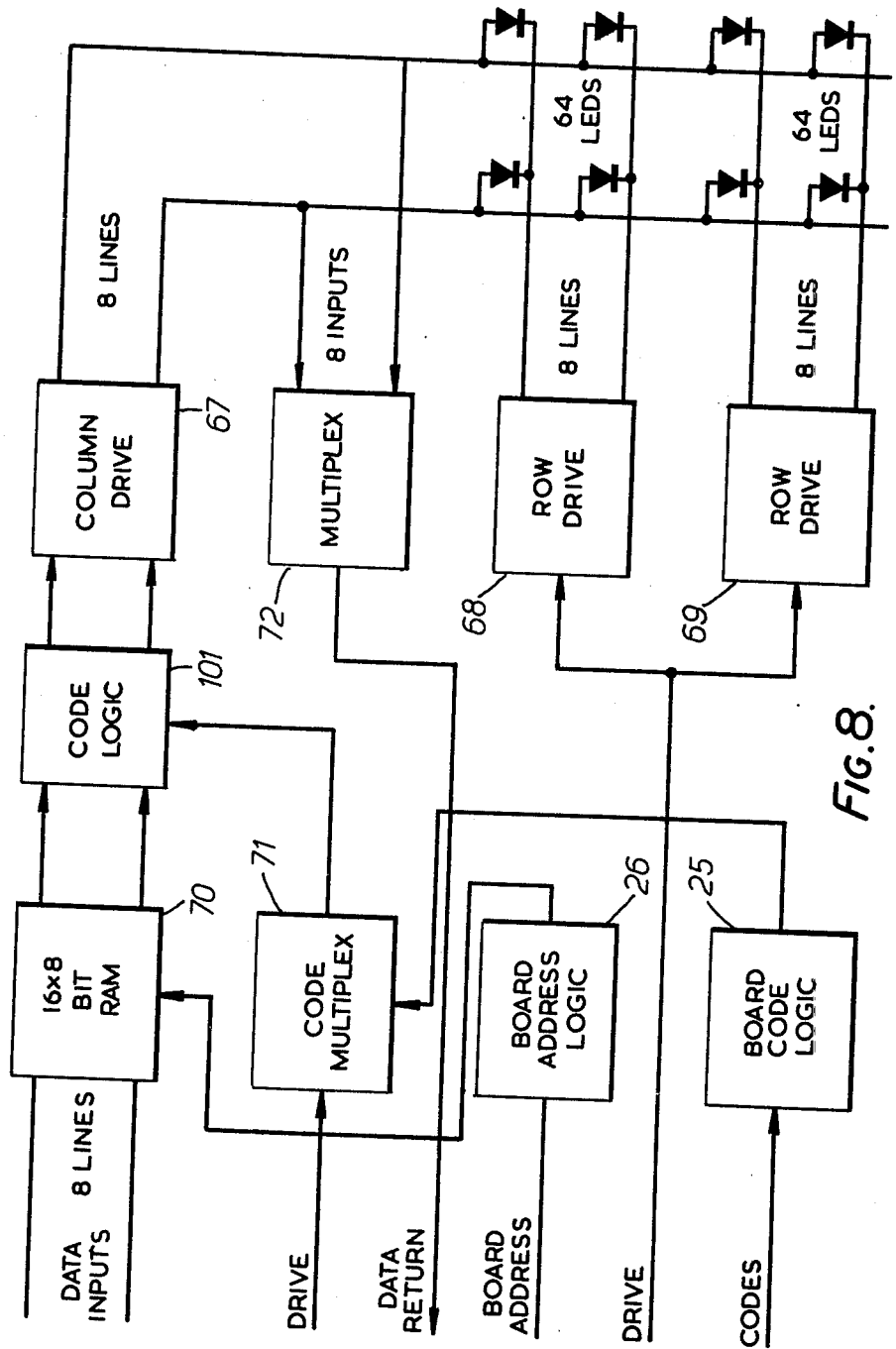
FIG. 8 illustrates in similar block diagram form a modified drive circuit arrangement.

Waveforms 9(b) similarly illustrates the illumination pulses of an 'OFF' display LED of the device of FIGS. 1 to 4;

Waveforms 9(c) and 9(d) similarly illustrate the illumination pulses of 'ON' and 'OFF' LEDs employing the arrangement of FIG. 8; and Waveforms 9(e) similarly illustrates a modified LED illumination coding.

DESCRIPTION OF THE PREFERRED EMBODIMENTS

The device illustrated comprises a casing 1 with brackets 2 for fixing to the wall and a hinged front frame 3 which encloses a modular display panel 4 including a rear support plate 5 on which display modules 6 are mounted. Each module contains either 128 light-emitting diodes (LEDs), 16 numeric displays or 16 alpha numeric displays. The described construction accommodates a maximum of 31 modules with a 1.27 cm spacing for the LEDs, thus providing a maximum display area of approximately 0.65 square meters. The modules 6 are positioned behind a transparent front screen 7 and this screen carries legends (not shown) denoting the specific data associated with each LED. Behind the display the casing 1, which is of aluminium with integral radio frequency screening, houses mains-energised power supply components 8 and a microcomputer 9 which operates to control the display modules 6 and the interface with the operator and any external devices, such as a computer, operative to change the displayed information.

Each module 6 consists of a front LED (or numeric) display board and a driver board which contains the electronics to drive the LEDs of the module, as later described. A light pen module 10 is mounted at the top lefthand corner of the display, and this is in the form of a single printed circuit board on the back of which a pen socket 11 projects so as to protrude from the panel. The light pen 12, shown diagrammatically in FIG. 2, consists merely of a handheld wand at one end of a fibre optic cable terminating in a plug which fits the socket 11. All the modules are connected together by a 50-way ribbon cable which is terminated at the microcomputer 9.

The microcomputer 9 comprises a card rack 13 which normally contains four printed circuit boards; namely a computer board 14 which contains the central processing unit and two interface circuits, a memory board 15 containing up to 8,192 bytes of programme memory and 4,096 bytes of temporary memory, a clock board 16 which provides the pulse waveforms required by the electronics, and a buffer board 17 which distributes signals to the appropriate circuit boards. Extra computer memory may be added if desired; for example, the memory capacity may be extended from 12,288 to 65,536 bytes.

Each LED display module 6 holds 128 diodes in two 8×8 matrices, each with 8 row and 8 column drivers. Referring to the system block diagram in FIG. 2 the upper half of this figure, which for convenience is split into three consecutive sections 2a, 2b and 2c illustrates reading from right to left and LED board 114 with associated driver board 115, a numeric display board 116 with associated driver board 117, and the pen module board 10. Each matrix of 64 LEDs of the LED board 114 has its own row driver 18 or 19 but shares a column driver 20. When one row and one column driver are ON the common diode is in the ON or light-emitting state, and the drive circuits 18 and 19 include current limiters to keep the diode currents down to a safe operating value. The LEDs of a module are scanned by enabling each row and column driver in turn. The current waveform in each LED is such that the latter appears to be either OFF or ON. In the OFF state the duty cycle is very low, say less than 0.012%, and in the ON state the duty cycle is increased to say 1.5%. Flicker is eliminated by employing a scanning frequency greater than 100 Hz.

A memory section of each driver board 115 comprises a 128 bit recirculating shift register 21 with associated recirculation logic circuit 100, the state of each bit corresponding to the state of a corresponding one of the LEDs of the module 6. This register 21 is clocked synchronously with decoders 22, 23 and 24, respectively operating to enable the drive circuits 18, 19 and 20, so that each LED displays the state of the corresponding bit of the shift register 21. A tap on the shift register after 64 bits allows each LED to be scanned twice for every revolution of the shift register 21, thus increasing the scanning frequency and reducing flicker.

Coding pulses are introduced to each LED once every shift register cycle. If the output of the register 21 is a 0 (LED OFF) the code logic 25 introduces short coding pulses during which the LED emits light, but so briefly that it still appears to be OFF although the light pulses are detectable by the light pen. These coding pulses are introduced via a select logic circuit 101 between the shift register 21 and the decoders 22 and 23. Conversely, if the shift register output is a 1 (LED ON) the code logic 25 changes the current drive waveform to turn the LED OFF briefly during the coding impulses but the diode still appears to be ON. The shift register 21 normally recirculates the bits therein unchanged, providing a constant display, but the bit instantaneously at the top of the register can at that time be modified by writing the new value to the Data In line, denoted DI, and simultaneously addressing the driver board 115 or 117 of the module 6 concerned with Address Lines 1 to 5, denoted A1 to A5 in FIG. 2b. Module selection logic 26 of each module compares the module address lines A1 to A5 with the module code which is set up by wire links from module code circuit 27. Thus if all module addresses are different only one module having the appropriate coding will be addressed.

Wire links also set up the code pulses which are used to flash one LED at a time, and in the described embodiment any two out of eight sequential pulses may be selected to provide a code with each module usually having a unique code. However, if so desired two or more modules may be similarly coded so that they are addressed simultaneously. Thus, in accordance with the invention, each LED is coded with a module code which identifies the module concerned and the LEDs on each module are scanned sequentially. It is thus possible to identify at which LED a pen is pointing.

The other signals applied at each LED module interface are denoted as follows. At B a blanking signal disables all the column drivers 20 and is effective to ensure that the column drivers blank the display during the change from one LED to the next. At C9 to C15 clock signals are applied to address the LEDs, and at T1 to T8 the timed coding pulses which are of 1 μS width.

A 128 μS squarewave pulse clock memory signal at CLM acts to clock the shift register 21 on the positive edge of the waveform. The Data In signal previously referred to is controlled by the microcomputer and must be stable during the positive edge of the CLM pulse. The Data Out signal at DO is a high impedance output when the module is not addressed; it provides data to the microcomputer 9 from the shift register when the module is addressed.

Figure 1:
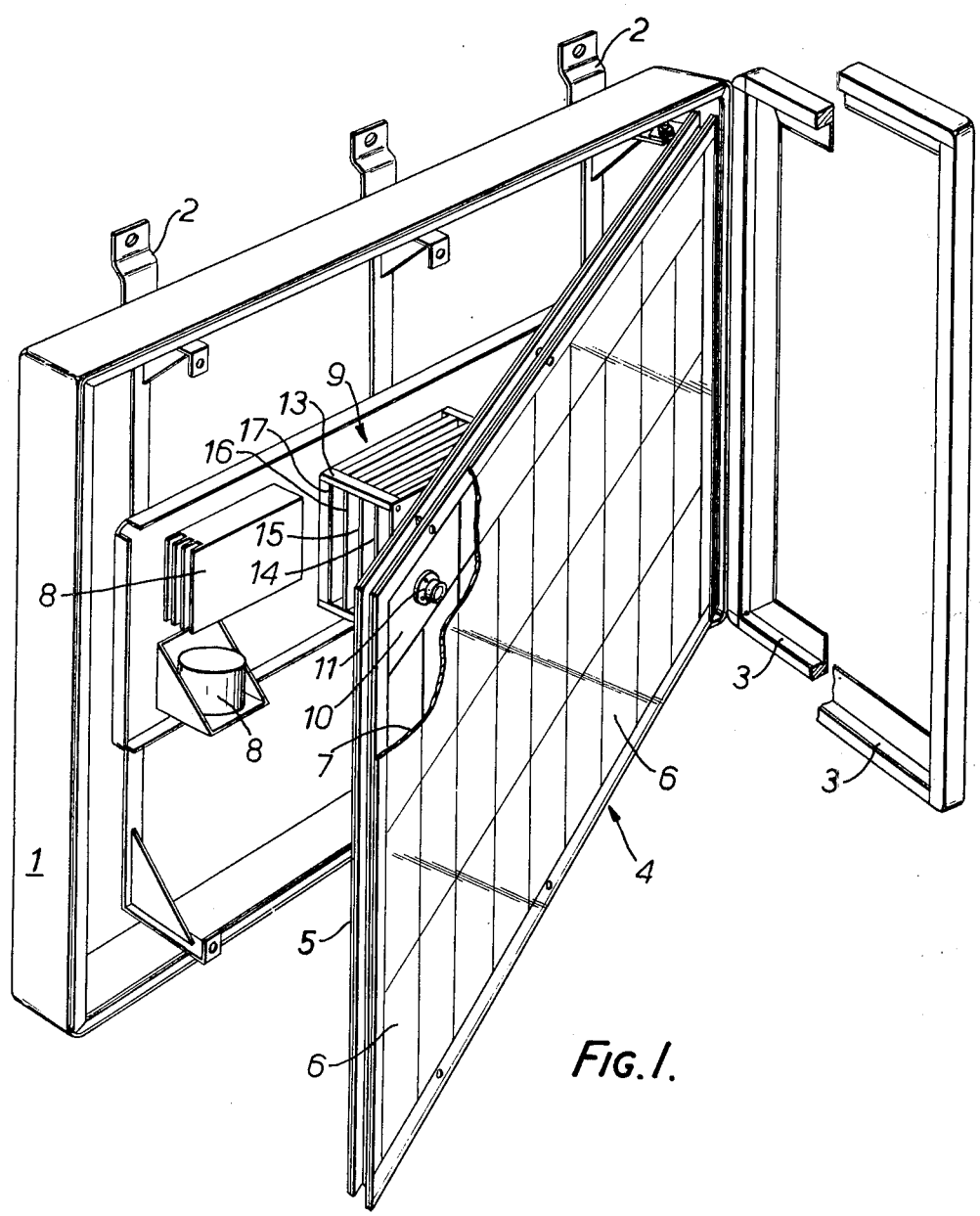
FIG. 1 is a perspective view of an interactive display device in accordance with the invention and employing a single microprocessor, this figure illustrating the mechanical arrangement of a panel thereof.
Figure 2A:
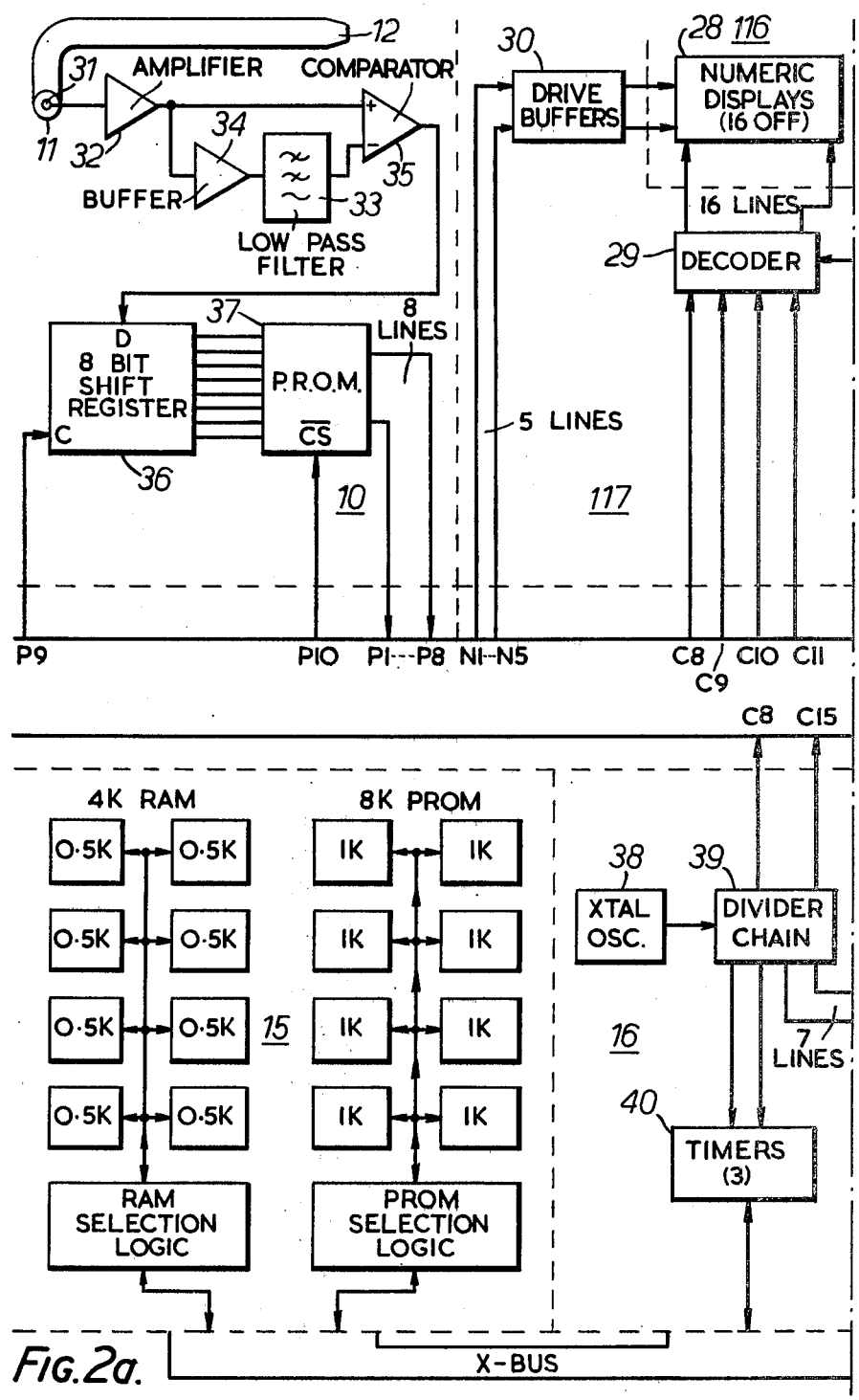
Figure 2C:
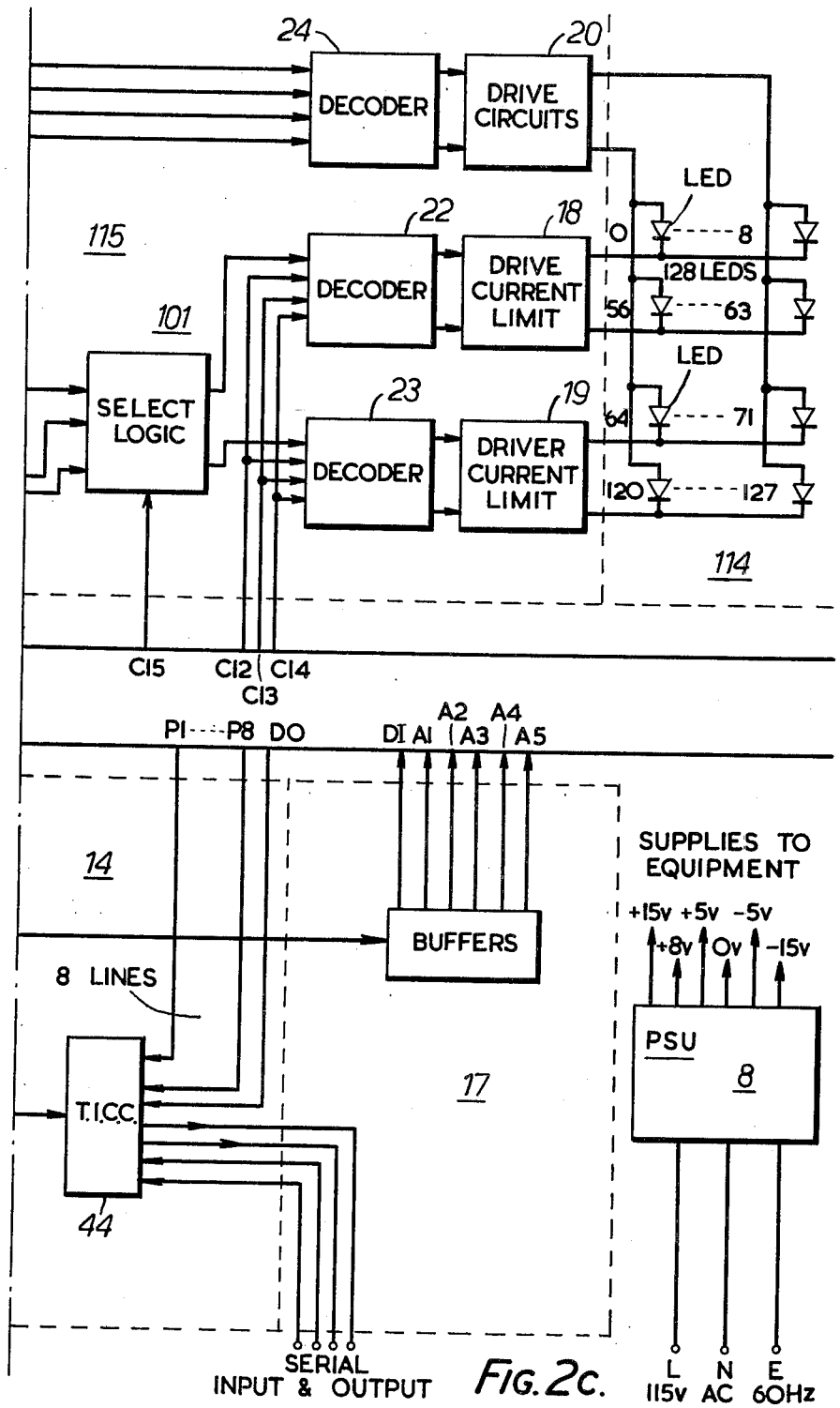

Referring now to the numeric display section of FIGS. 2(a), 2(b) and 2(c), sixteen numeric displays 28 are mounted in rows across a corresponding display module 6 and each contains integral data latches. A decoder circuit 29 enables each display 28 in turn if the module has been selected. The signals applied at a numeric module interface are denoted as follows. A1 to A5 are module address lines as with an LED module, again associated with module selection logic and module code circuits 26 and 27. At C8 to C11 clock signals are applied to drive the decoder 29, and at N1 to N5 numeric signals are applied to drive the numeric displays 28 and the decimal point through drive buffer circuits 30. In the case of an alpha display eight corresponding signals N1 to N8 will be required, operation otherwise being the same.

Two methods of writing to the numeric displays 28 are available. Each display may be addressed individually by placing the number to be written on the numeric lines N1 to N5 and putting up the corresponding module address briefly when the decoder 29 is decoding the appropriate digit. Alternatively, the module address may be left up for a longer period and the numeric signals varied in synchronism with the decoder 29. In the latter case it is possible to write to a number of sequential digits.

Referring now to the pen module 10, a photodiode 31 mounted in the socket 11 detects light picked up by the light pen 12 and transmitted along the fibre optic cable, and the resultant output signal is amplified by an amplifier 32 and a deliberate voltage offset induced. The output of amplifier 32 is compared by a comparator amplifier circuit 35 with the same signal after it has passed through a low pass filter 33 via a buffer amplifier 34. The two compared waveforms, showing light outputs from a weak OFF LED, a weak ON LED, a strong OFF LED and a strong ON LED as identified are shown respectively in FIG. 3a at 102 and 103 in full and broken lines. This example of typical waveforms, showing the effect of interfering signals also, relates to module codes with two consecutive pulses. The resultant output of the comparator circuit 35 is shown at 104 in FIG. 3b, from which it can be seen that the procedure described ensures that the circuit responds only to pulse type signals and will cope equally well with strong or weak light levels.

The comparator output is clocked down an eight bit shift register 36 in synchronism with the coding pulses. Eight parallel outputs of this shift register are decoded in a programmable read only memory (P.R.O.M.) 37, the output of which is the address of the module on which the selected LED is located. To guard against the pen not being close enough to a LED to receive proper signals, or an adverse effect if elecromagnetic radiation is present, only properly encoded inputs will produce valid outputs. The signals at the pen module 10 interface are as follows: at P1 to P8 the outputs from the P.R.O.M. 37, these indicating the LED module address, ON or OFF state of the LED, and providing a microcomputer interrupt signal; at P9 a clock signal for the shift register 36; and at P10 a Not Chip select signal for the P.R.O.M. 37.

Referring now to the lower half of FIGS. 2(a), 2(b) and 2(c), the clock board 16 has a crystal-controlled oscillator 38 providing a reference frequency which is fed to a divider chain 39, the outputs of which provide the accurate timing signals C8 to C15 for the modules 6 and the microcomputer circuits. The board 16 also contains three timers, collectively referenced 40, which are directly under the control of the central processing unit of the microcomputer, and logic circuits 41. Signals present at the clock board edge connector, in addition to the timing signals at C8 to C15 (8 lines), are the signals CLM, B, T1 to T8, P9 and P10 previously mentioned and provided by the logic circuits 41 from a seven line input from the divider chain 39.

The portion of the memory containing preprogrammed instructions has already been referred to as programmable read only memory (P.R.O.M.) with 8,192 bytes available for programme as standard. The P.R.O.M. is programmed before use and is erasable only under ultra violet light. The portion of the memory used as a temporary store of information is called random access memory with 4,906 bytes available as standard. This store is volatile and information is lost when power is switched off. The central processor unit communicates with the memory by a number of signals contained within a connecting system denoted X-BUS. Provision has been made for up to 65,536 bytes of memory on additional printed circuit boards. If further memory is required, then an external memory system (such as floppy disc storage) is required.

The microcomputer retains control of the Data In, Numeric, Address and Serial Output signals. Data may be sent to any module at the correct time by synchronisation to the clock lines. The microcomputer may also receive signals via the Pen, Data Out and Serial Input lines. Thus it is the microcomputer which controls the organisation of the modules 6 in the panel. At any time, a central processing unit 42 may be dealing with any of the following five types of action.

(a) Reading from or writing to a module
 (b) Reading from or writing to the Serial Interface
 (c) Processing a pen signal
 (d) Computing under control of the programme
 (e) Carrying out a "housekeeping" routine.

To read from or write to a module 6, the processor samples the clock lines to determine the instant at which the required data is present at the module and then addresses the module via the address lines.

The serial interface control is handled by the interface block 44. Data rates from 110 to 9600 Bauds may be accommodated using a 20 mA current loop, and other interfaces such as that known by the designation RS232C may be made available. When signals are received from the pen module 10 via lines P1 to P8, the P.R.O.M. on that module has already filtered out grossly erroneous detections. The processor receives the address of the board upon which the detected LED is situated from the pen module. The LED number is ascertained by sampling the clock lines with the processor. In order to ensure that no error is made, a number of identical sequential detections are required. The probability of a "false" response is thus reduced to negligible proportions.

The processor must follow the logical sequence of the programme contained in P.R.O.M. Some typical calculations which may be carried out by the processor are listed below:

(a) A number may be associated with a particular LED and retained for display (e.g. Stock Numbers).

(b) A time may be likewise associated with a LED (e.g. Time of fault occurrence).

(c) The number of LEDs ON may be calculated for display.

(d) If one LED is put ON, any number of associated LEDs may be switched OFF or ON in a fixed sequence.

(e) Any number of LEDs may be made to flash.

The number of possible reactions is extremely large and in practice is limited by the skill of the programmer and the required reaction time of the panel.

The housekeeping routine previously referred to ensures that no erroneous information is being displayed and continuously monitors each module shift register for errors. If used as a display panel, the processor is normally concerned with this routine.

The computer board 14 contains a central processor unit 42 which carries out a preprogrammed set of instructions contained in the programme memory. This board also contains a clock and timers circuit 105 having a two-way association with the processor unit 42, two interface blocks, namely a general interface and control chip 43 and a timer, interrupt and communication control chip 44. Said instructions may cause the central processor unit 42 to react from or write to either of the blocks 43 and 44, or the temporary memory.

The signals present at the microcomputer interface are as follows: C8 to C15 which synchronise the processor 43 to the module shift registers 21; P1 to P8 from the pen module 10; DO, the return data from the modules 6; DI, data line to modules; A1 to A5, module address line signals; N1 to N4, numerical address line signals; and serial input and serial output signals, respectively providing the interface input from and output to the external drive.

As already mentioned the code used for scanning the individual LED arrays comprises any two of eight 1 μS. pulses. These are illustrated graphically in FIG. 4 which show the relative positioning of the full set of pulses denoted, 106, . . . , 113, which have a spacing of 1 μS, within the scanning cycle of 128 μS. As shown the blanking period is of 4 μS duration and overlaps each end of the cycle by 2 μS. It will be appreciated that other variations are possible, and to ensure that the number of boards used can be supported an extra address line A6 may be incorporated and the number of possible coding pulses increased. The encoding arrangement described ensures that the pen P.R.O.M. 37 decodes the module address from the encoded pulses, but this is not mandatory.

Uses of the described panel include interactive displays with computer or external sensor inputs and intercommunicating display panels. It may also be used for data storage and retrieval, either linked to an external data storage system or as a "stand alone" unit.

Figure 5:
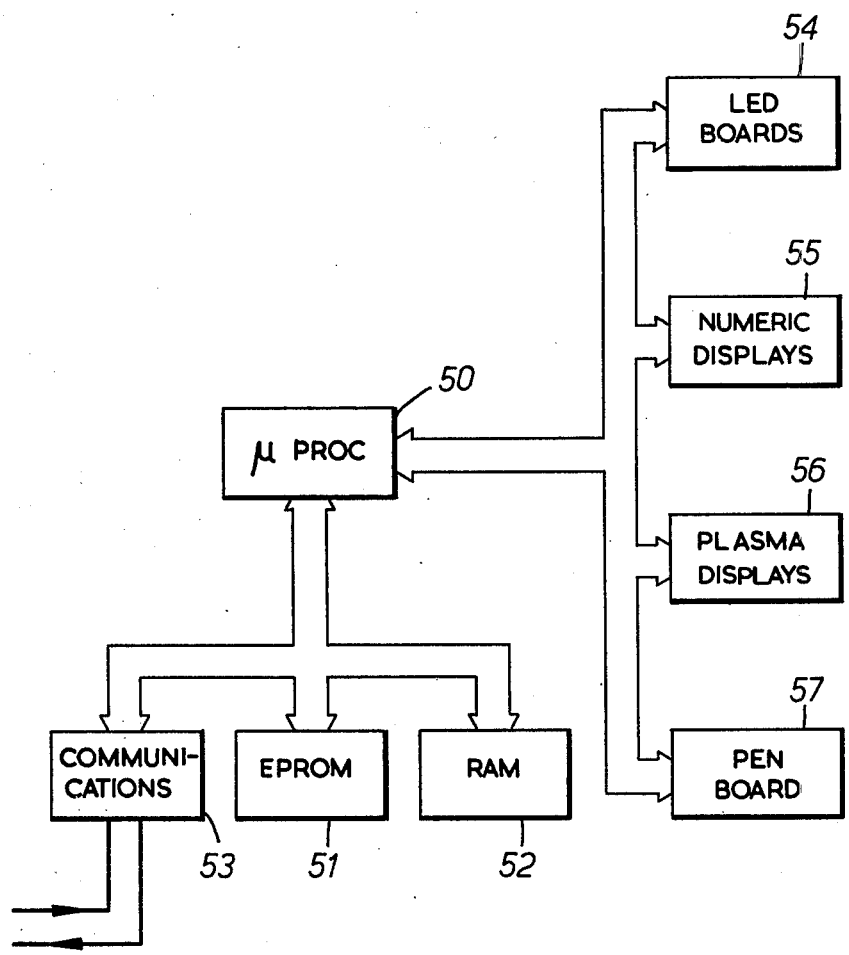
FIG. 5 is a simplified block diagram of a generally similar device again employing a single microprocessor unit.

FIG. 5 is a simplified block diagram of a generally similar device employing a single microprocessor unit 50 with associated P.R.O.M. 51, R.A.M. 52 and communications circuits 53, generally as previously described. The system as illustrated in FIG. 5 includes display means comprising twenty-eight LED modules 54, thirty-one numeric display modules 55 and a 480 character plasma display 56. These cooperate, as described, with a pen board 57 providing the light pen module 10. As a modification, while still employing the coding and display element identification methods of the invention, a multiprocessor system may be employed as illustrated in the corresponding block diagram of FIG. 6.

Figure 6:
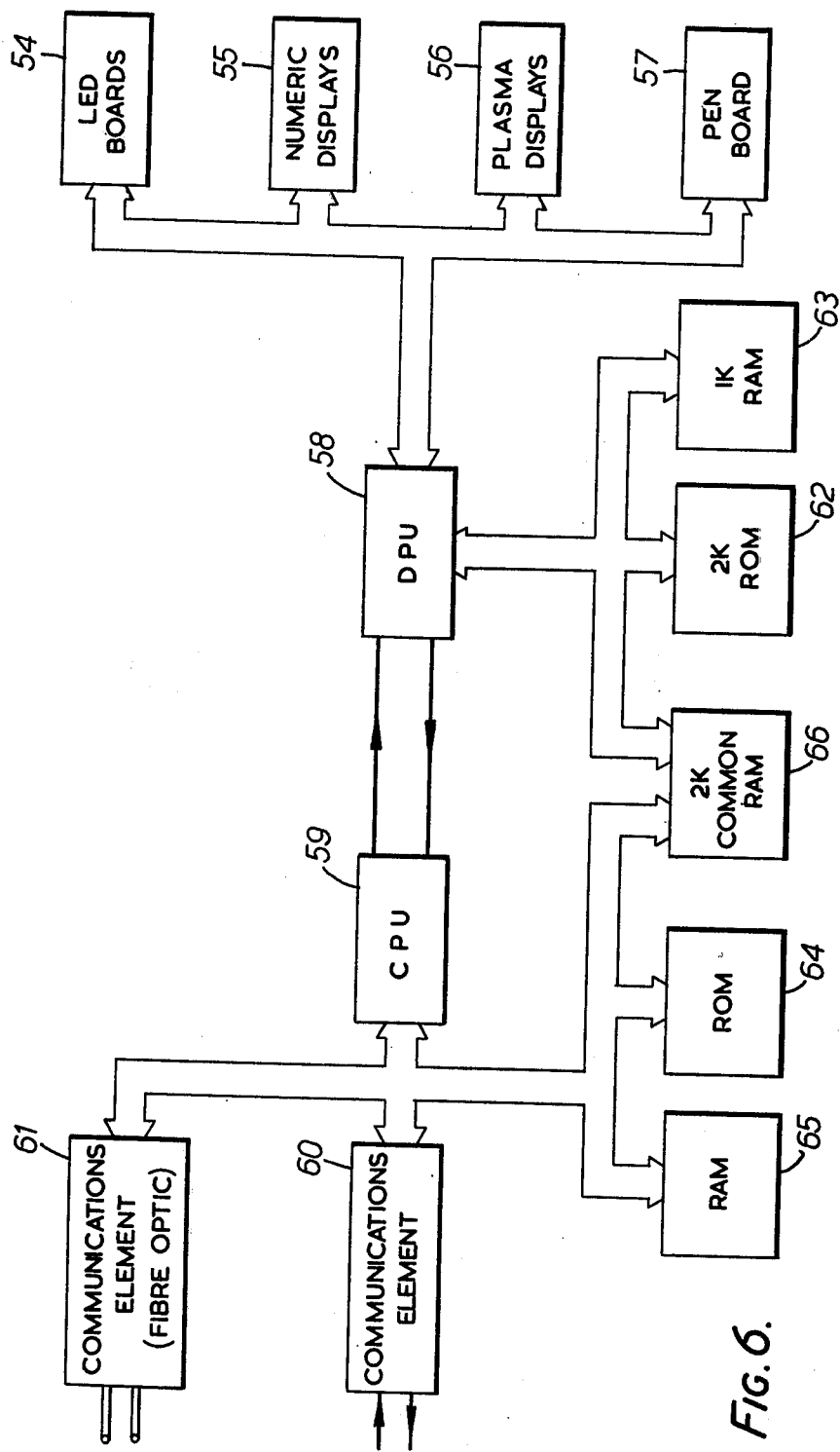
FIG. 6 is a corresponding block diagram of a modified device replacing the single microprocessor of FIG. 5 by a display processor unit and a central processor unit.

In the modification of FIG. 6 the single microprocessor of the earlier system is replaced by a display processor unit 58 (D.P.U.) and a central processor unit 59 (C.P.U.). The processor unit 58 services the displays 54, 55 and 56 and the pen board 57, while the processor unit 59 carries out the user programme and communications functions. The latter are handled by a main "hard-wire" communications element 60 and a fibre optic communications element 61. The fibre optic communication element 61 is an alternative to the hard-wire communications element 60, and like the latter can be used for two-way communications with other display panels, computers, etc. As shown in FIG. 6 the processor unit 58 is associated with its own memory units, a 2K R.O.M. 62 and a 1K R.A.M. 63; the processor unit 59 also is associated with its own memory units, a R.O.M. 64 and a R.A.M. 65 with a total maximum of 6K (64,000 bytes) storage; and both processor units share a common 2K R.A.M. 66. The contents of this common R.A.M. 66 are a binary representation of the states of all the display elements defined by the central processor unit 59 and displayed by the display processor unit 58.

Figure 7:
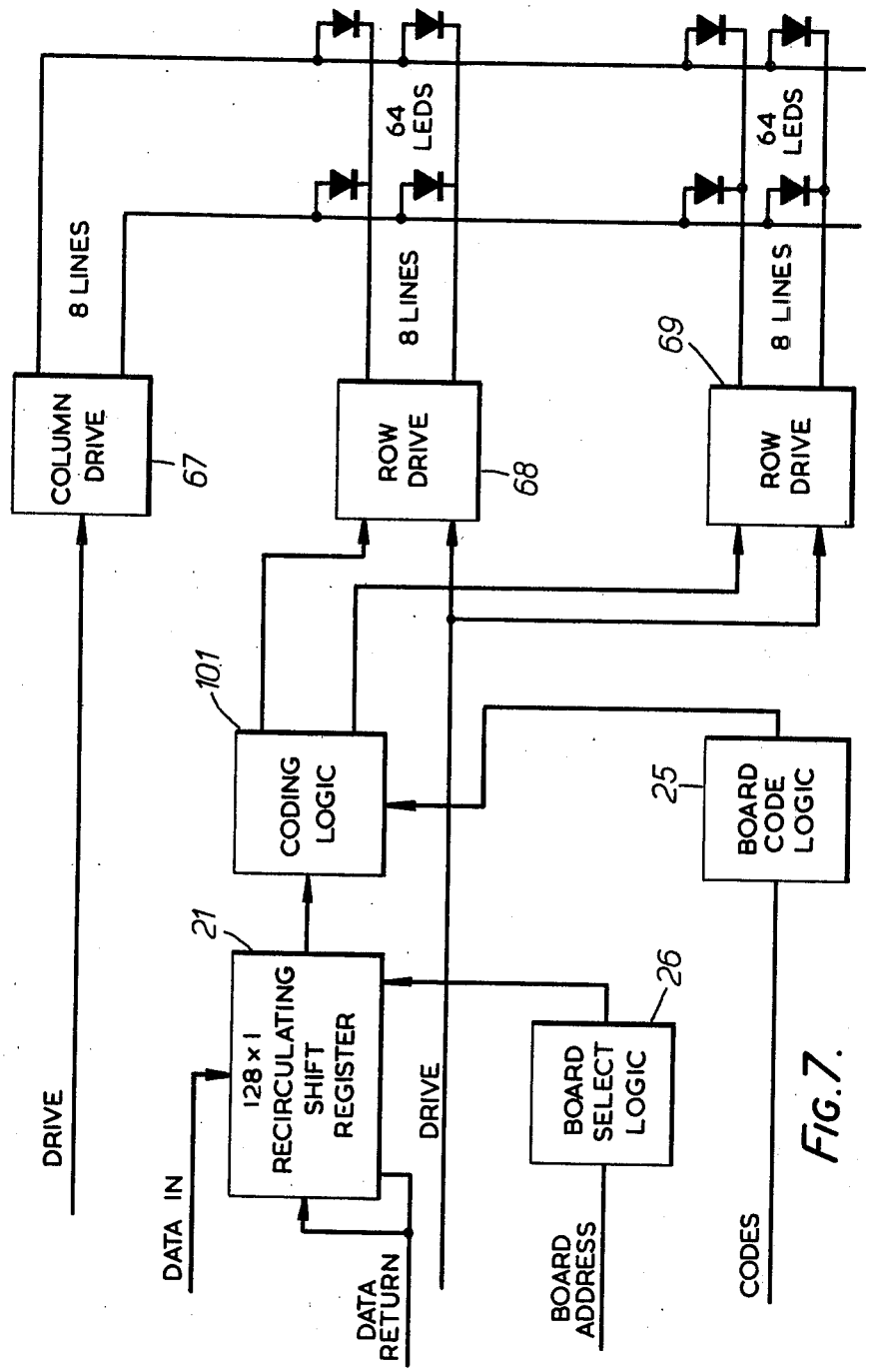
FIG. 7 illustrates in simplified block diagram form drive circuits of the device of FIGS. 1 to 4.

FIG. 7 illustrates in a simplified block diagram form the drive circuits of a LED display module as described in connection with the driver board 115 of FIGS. 2(b) and 2(c). This diagram shows the recirculating shift register 21 and the module selection logic 26, the select logic circuit 101 and code logic 25, all as described associated with a column drive circuit 67 and two row drive circuits 68 and 69. The column drive circuit 67 corresponds to the decoder/drive circuit combination 20,24 of FIG. 2(c), and the row drive circuits 68 and 69 correspond respectively to the decoder/drive circuit combinations 18,22 and 19,23 of FIG. 2(c). FIG. 8 illustrates in similar block diagram form a modified drive circuit arrangement for a LED module, in which the shift register memory is replaced by a 16×8 bit R.A.M. 70. This use of an 8 bit wide memory allows faster access times and enables drive to be applied to eight LEDs simultaneously.

Figure 9:
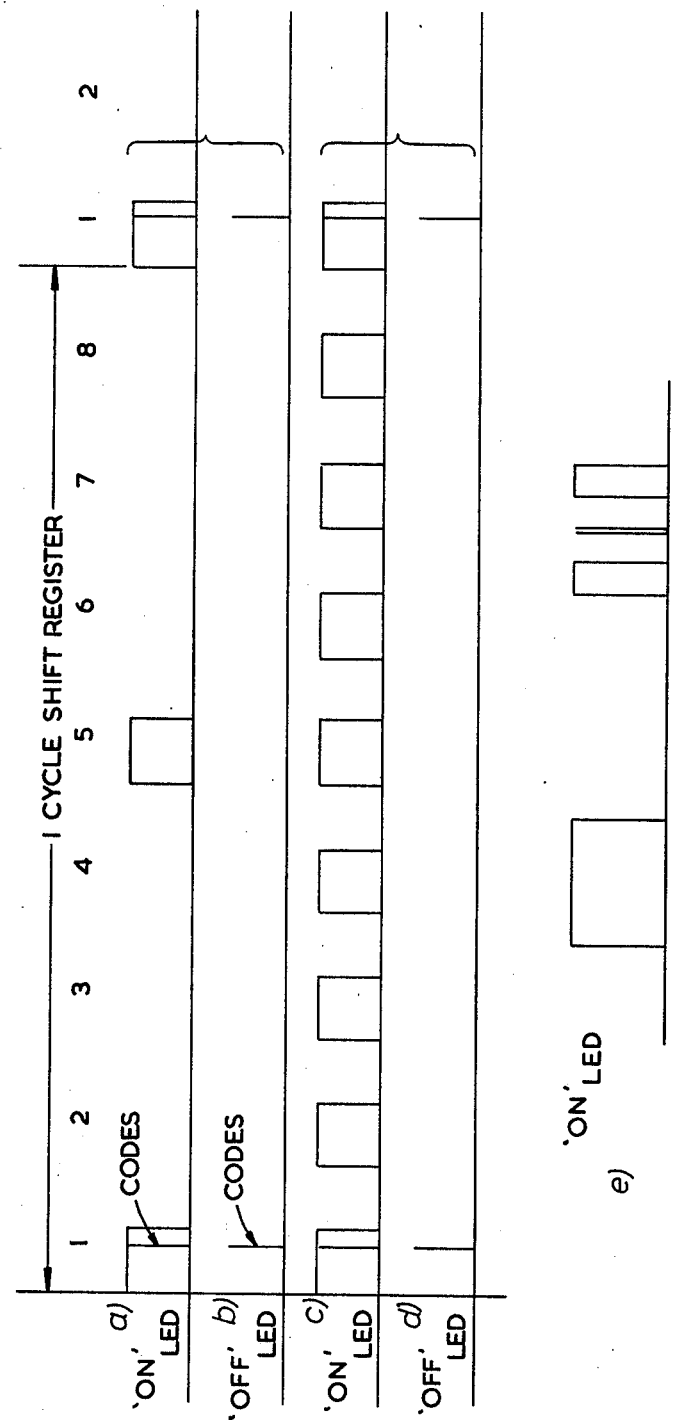
FIG. 9 illustrates graphically the illumination pulses associated with the circuitry of the present invention wherein, Waveforms 9(a) illustrates graphically the illumination pulses of an 'ON' display LED of the device of FIGS. 1 to 4.

Waveforms (a) and (b) of FIG. 9 illustrate graphically the illumination pulses of an ON LED and an OFF LED respectively, using a shift register memory as in FIG. 7. As shown each ON LED is illuminated twice during one cycle of the shift register as previously described in connection with FIG. 2, and the coding pulses are applied once per cycle. Waveforms (c) and (d) of FIG. 9 show similarly the illumination of ON and OFF LEDs, respectively, using the alternative random access memory 70 of FIG. 8. As shown in Waveform (c) of FIG. 9 the ability to drive eight LEDs simultaneously results in eight pulses of illumination for an ON LED over a corresponding cycle, thereby allowing an equivalent reduction of the drive current to the LEDs for the same apparent brightness to an observer. This results in considerably increased reliability.

Corresponding circuit blocks in FIGS. 7 and 8 share the same reference numerals, and in FIG. 8 a code multiplex circuit 71 to which the drive input is applied is interposed between logic circuits 101 and 25. This is required to handle the simultaneous driving of eight LEDs. A further multiplex circuit 72 with inputs from the eight LED column drive lines provides the data return from the LED driver board, and the current in the LEDs is measured by the multiplex circuits to enable self-test routines to encompass detection of a failed LED by the display processor unit 58.

The code logic of the drive circuit arrangements of FIGS. 7 and 8 uses exclusive OR gates to code OFF LEDs so that they are briefly and non-visually ON during the coding pulses and to code ON LEDs so that they are briefly and non-visually OFF during the coding pulses as has been described. These circuits are not the subject of a detailed description herein, as the manner in which exclusive OR gates can be so employed will be clear to persons skilled in the art. However, as a further modification, the exclusive OR gates can be eliminated by employing code logic such that an OFF LED is still coded ON but the ON LEDs are also in effect coded ON by turning them into OFF LEDs during the coding period. This is illustrated in Waveform (e) of FIG. 9.

Waveform (e) shows two consecutive pulses of an ON LED during the second of which the coding period occurs, exactly the same coding pulses now being applied to an LED whether it is ON or OFF. This simplification may be extended further, particularly with the drive circuit arrangement of FIG. 8 which increases the frequency of illumination of the LEDs, with coding every eight ON periods as in Waveform (c) of FIG. 9 such that a LED is ON seven times and OFF once during a complete coding cycle, or is ON six times and OFF twice, etc. The coding ON during the OFF period or periods is detected by the light pen with resultant identification of the LED concerned which, to the observer, still appears to be lit with uniform brightness.

We claim:

1. An interactive display device comprising a plurality of arrays of discrete display elements; driver circuit means which scan the arrays of said plurality thereof simultaneously with signals which determine whether each display element is in the ON or the OFF state and which include coded pulses the coding of which is representative of the array being scanned; and means for inputting data comprising a light pen which can be pointed at a selected display element relating to the input data, and circuit means operative to identify the coded pulses and thus identify the array containing the selected display element.

2. An interactive display according to claim 1, wherein said driver circuit means include a recirculating shift register for each array clocked in synchronism with the scanning of that array, each bit of each such shift register corresponding to one of the display elements of the related array.

3. An interactive display device according to claim 1, wherein a microcomputer controls the display and an interface with the operator and an external device, such as a computer, operative to change the displayed information or react according to the information displayed, whereby when the operator communicates with the display by pointing said light pen at a chosen one of said display elements the microcomputer reacts according to a preprogrammed set of instructions.

4. An interactive display device according to claim 1, wherein a pen circuit associated with said light pen comprises a light-sensitive cell, and includes an amplifier to amplify the output of said light-sensitive cell, and a comparator which compares the amplified output with that output after passing through a low-pass filter, whereby to respond only to the coded pulse-type signals independently of the illumination levels of the display elements and produce a comparator output signal which effectively eliminates interfering signals.

5. An interactive display device according to claim 4, comprising a shift register having a number of bits equal to the total number of coding pulses employd for producing the identifying coded scanning pulses applied to the respective arrays of discrete display elements, clock circuit means operative to clock the comparator output signal down the shift register in synchronism with the coding pulses, the same number of parallel outputs of the shift register being decoded in a programmable read only memory the output of which is the address of the array in which the selected display element is located.

6. An interactive display device according to claim 1, wherein said plurality of arrays are respectively and individually disposed on display modules which together provide a total display area consisting of said modules, each said module comprising the corresponding array of display elements in the form of a matrix of orthogonal rows and columns of light-emitting diodes and further comprising driver circuit means for the display elements of that module.

7. An interactive display device comprising a plurality of arrays of discrete display elements; driver circuit means which scan the arrays of said plurality thereof simultaneously with scanning signals which determine whether each display element is in the ON or the OFF state and which include coded pulses the coding of which is representative of the array being scanned, said driver circuit means including a like plurality of recirculating shift registers individually associated with the arrays and clocked in synchronism with the scanning thereof, each bit of each such shift register corresponding to one of the display elements of the associated related array and a tap on each shift register after half the number of bits therein thus allowing each associated display element to be scanned twice for every revolution of the shift register, thereby increasing the scanning frequency and reducing flicker; and means for inputting data comprising a light pen which can be pointed at a selected display element relating to the input data, and circuit means operative to identify the coded pulses and thus identify the selected display element.

8. An interactive display device in the form of a self-contained wall-mounted panel unit with a transparent front; a display area behind said transparent front provided by a modular arrangement of array modules providing a plurality of arrays of discrete display elements, each such module comprising a matrix of light-emitting diodes providing the display elements and also comprising array driver circuit means for such diodes, said driver circuit means being operative so that all said arrays are scanned simultaneously with signals which determine whether each diode is in the ON or the OFF state and which include coded pulses the coding of which is representative of the array concerned, each matrix of diodes presenting an array of numeric displays or an array of alpha-numeric displays; and a pen module with a pen connection socket for connection of a light pen which can be pointed at a selected display element to input data to which that display element relates, and circuit means operative to identify the coded pulses and thus identify the array containing said selected display element; a casing of the panel unit housing behind the display area a microcomputer operative to change the displayed information or to react according to the information displayed and which functions according to a preprogrammed set of instructions when the light pen is pointed at one of the display elements, with power supply and other circuits of the device also being housed within the casing behind the display area.

* * * * *